(12) United States Patent
Aubert

(10) Patent No.: US 7,951,861 B2
(45) Date of Patent: May 31, 2011

(54) COUPLING AGENT FOR ELASTOMERIC COMPOSITION COMPRISING A REINFORCING FILLER

(75) Inventor: Thierry Aubert, Pau (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 12/898,088

(22) Filed: Oct. 5, 2010

(65) Prior Publication Data

US 2011/0021661 A1 Jan. 27, 2011

Related U.S. Application Data

(63) Continuation of application No. 12/509,712, filed on Jul. 27, 2009, now abandoned, and a continuation of application No. 10/560,880, filed on Dec. 13, 2005, now abandoned.

(30) Foreign Application Priority Data

Jun. 16, 2003 (FR) ...................................... 03 07193
May 28, 2004 (FR) ................... PCT/FR2004/001328

(51) Int. Cl.
*B60C 1/00* (2006.01)
(52) U.S. Cl. ........................................ 524/262; 524/331
(58) Field of Classification Search .................. 524/262, 524/331
See application file for complete search history.

(56) References Cited

U.S. PATENT DOCUMENTS 6,172,154 B1 * 1/2001 Brown et al. .................. 524/495
6,291,572 B1 * 9/2001 Brown et al. .................. 524/492

* cited by examiner

*Primary Examiner* — Peter D Mulcahy
(74) *Attorney, Agent, or Firm* — Steven D. Boyd

(57) ABSTRACT

A method of decreasing the roiling resistance of a tire formed from a sulfur-vulcanized elastomeric by combining at least one diene elastomer and at least one reinforcing filler, with an effective amount of a coupling agent consisting of a combination of:

10 to 90%, of a product (I) consisting of a blend of poly (alkylphenol) polysulfides of formula:

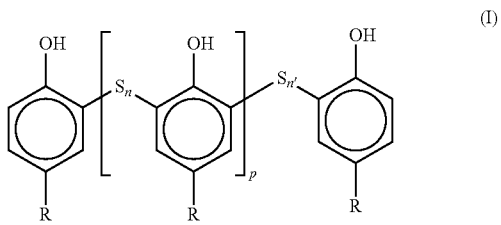

(I)

in which:
R is an alkyl radical containing 1 to 20 carbon atoms;
n and n' are two integers, which may be identical or different, from 1 to 8;
p is an integer from 0 to 50; and
10 to 90% of a product (II) consisting of bis(triethoxysilylpropyl)tetrasulfide, to form a mixture; thereafter
working said mixture; and thereafter
heating said mixture to vulcanize said mixture. 90% of bis(triethoxysilylpropyl)tetrasulfide.

8 Claims, No Drawings

COUPLING AGENT FOR ELASTOMERIC COMPOSITION COMPRISING A REINFORCING FILLER

This application is a continuation of U.S. patent application Ser. No. 12/509,712 filed Jul. 27, 2009 which application is a continuation of U.S. patent application Ser. No. 10/560,880 filed Dec. 13, 2005

FIELD OF THE INVENTION

The present invention relates to the field of rubber compositions intended in particular for the manufacture of tires, and more especially for the manufacture of tire treads for motor vehicles. The subject of the invention is more particularly a sulfur-vulcanizable elastomeric composition containing a reinforcing filler and a specific coupling agent.

BACKGROUND OF THE INVENTION

Extensive research has been carried out on improving the properties required for tire covers. In connection with the permanent objective of reducing the fuel consumption of motor vehicles, efforts are thus made to improve the rolling resistance of said covers, while still maintaining excellent grip both to dry surfaces and to wet surfaces, as well as suitable wear resistance.

Elastomeric compositions intended to form these treads are already known. They generally comprise, apart from a diene elastomer, a reinforcing filler. This reinforcing filler is generally carbon black or silica.

To obtain optimum reinforcement properties conferred by the filler, it is known that it is necessary for the filler to be present in the elastomer matrix in a final form that is both as finely divided as possible and as uniformly distributed as possible. However, such conditions cannot be met except if the filler has a very high capability, on the one hand, of being incorporated into the matrix during mixing with the elastomer and, on the other hand, of being uniformly dispersed within said matrix.

As is known, carbon black has such a capability, but this is not the case in general for silica particles. This is because, for reciprocal affinity reasons, silica particles have an annoying tendency to form agglomerations in the elastomer matrix. This has a deleterious effect on the reinforcing properties of the final product obtained after vulcanization. It is also problematic insofar as, by increasing the viscosity of the elastomer, silica, after it has been incorporated, makes the vulcanizable elastomeric composition difficult to work or to compound, especially when the non-sulfur-containing additives and the vulcanization system are being incorporated by mixing, or when the compound containing all the ingredients is being introduced into a vulcanization mold.

However, the use of silica in the manufacture of tire treads is particularly advantageous insofar as it is able to lower the rolling resistance and therefore give a substantial fuel saving.

The prior art has already described products that promote the dispersion of a filler, especially silica, in an elastomeric composition. Such products are often called coupling agents.

Thus, European patent application EP 0 501 227 mentions, for a sulfur-vulcanizable composition comprising a conjugated-diene copolymer reinforced by silica, the use of 12.8 parts by weight (per 100 parts of rubber) of a reinforcing agent comprising 6.4 parts by weight of a polysulfidic organosilane.

International application WO 97/42256 also mentions, for elastomeric compositions containing silica, the use as coupling agent of a specific polysulfidic organosilane, namely bis(triethyoxysilylpropyl)tetrasulfide, also known by the brand name Si-69® from Degussa AG. This coupling agent, which is widely used in industry, does however have the drawback of being extremely expensive.

This is the reason why the above document teaches, essentially, elastomeric compositions containing treated carbon black as reinforcing filler, for which it recommends the use, as prevulcanization modifier, of a non-organosilane polysulfide compound, for example the use of a tert-butylphenol polysulfide.

International application WO 02/083719 again deals with the problem of replacing bis(triethoxysilylpropyl)tetrasulfide as coupling agent with a white filler (such as silica) in a composition based on diene rubbers. For this purpose, it proposes polysulfidic monoorganoxysilanes. However, the latter compounds also cause excessive costs because of the chemistry used.

SUMMARY OF THE INVENTION

The aim is therefore to find—and this is the object of the present invention—novel coupling agents of lower cost than Si-69 and ensuring optimum properties for tire treads, while still maintaining acceptable theological properties for the processing and treatment of vulcanizable compositions, especially as regards their viscosity.

In the present text, the % values indicated correspond, unless otherwise indicated, to contents expressed by weight.

DETAILED DESCRIPTION OF THE INVENTION

The subject of the present invention is a sulfur-vulcanizable elastomeric composition comprising at least one diene elastomer and at least one reinforcing filler, characterized in that it can be obtained by a process comprising the mixing of said elastomer and said filler with an effective amount of a coupling agent consisting of a combination of:

10 to 90%, preferably 50 to 70%, of a product (I) consisting of a blend of poly(alkylphenol) polysulfides of formula:

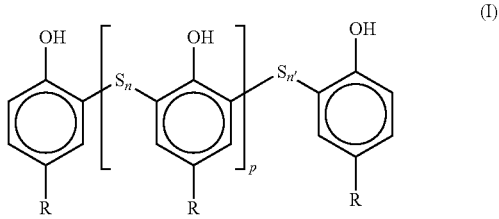

in which:
R is an alkyl radical containing 1 to 20, preferably 4 to 10, carbon atoms;
n and n' are two integers, which may be identical or different, from 1 to 8, preferably from 1 to 4;
p is an integer from 0 to 50, preferably from 0 to 20; and
10 to 90%, preferably 30 to 50%, of a product (II) consisting of bis(triethoxysilylpropyl)tetrasulfide.

It has in fact been found, surprisingly, that the introduction of an effective amount of the product of formula (I) makes it possible, while still maintaining the viscosity of the vulcanizable composition, to reduce the required amount of bis(triethoxysilylpropyl)tetrasulfide (or Si-69) and to improve the properties of treads manufactured from said composition, especially with respect to the rolling resistance and wet grip (grip to wet ground). Thus, it is unnecessary to use large amounts of silyl compounds, as taught by the prior art, and the invention provides a practical technical and economical alternative to the exclusive use of Si-69.

The composition according to the invention may comprise one or more diene elastomers. The term "diene elastomers" is understood more precisely to mean;

(1) homopolymers obtained by the polymerization of a conjugated diene monomer having from 4 to 22 carbon atoms, such as for example: 1,3-butadiene, 2-methyl-1,3-butadiene, 2,3-dimethyl-1,3-butadiene, 2,3-diethyl-1,3-butadiene, 2-methyl-3-ethyl-1,3-butadiene, 2-chloro-1,3-butadiene, 2-methyl-3-isopropyl-1,3-buta-diene, 1-phenyl-1,3-butadiene, 1,3-pentadiene and 2,4-hexadiene;

(2) copolymers obtained by the copolymerization of at least two of the aforementioned conjugated dienes with each other or by the copolymerization of one or more of the aforementioned conjugated dienes with one or more ethylenically unsaturated monomers chosen from:

vinylaromatic monomers having from 8 to 20 carbon atoms, such as for example: styrene, ortho-methylstyrene, meta-methylstyrene, para-methylstyrene, the commercial mixture "vinyltoluene", para-tert-butyl-styrene, methoxystyrenes, chlorostyrenes, vinylmesitylene, divinylbenzene and vinylnaphthalene;

vinyl nitrile monomers having from 3 to 12 carbon atoms, such as for example acrylonitrile and methacrylonitrile; and acrylic ester monomers derived from acrylic acid or from methacrylic acid with alkanols having from 1 to 12 carbon atoms, such as for example: methyl acrylate, ethyl acrylate, propyl acrylate, n-butyl acrylate, isobutyl acrylate, 2-ethylhexyl acrylate, methyl methacrylate, ethyl methacrylate, n-butyl methacrylate and isobutyl methacrylate, which copolymers may contain between 99% and 20% by weight of diene units and between 1% and 80% by weight of vinylaromatic, vinyl nitrile and/or acrylic ester units;

(3) terpolymers obtained by the copolymerization of ethylene, an α-olefin having 3 to 6 carbon atoms and an unconjugated diene monomer having 6 to 12 carbon atoms, such as for example elastomers obtained from ethylene, propylene and an unconjugated diene monomer of the aforementioned type, such as especially 1-4 hexadiene, ethylidene norbornene and dicyclopentadiene (EPDM elastomer);

(4) natural rubber;

(5) copolymers obtained by the copolymerization of isobutene and isoprene (butyl rubber) and also halogenated, in particular chlorinated or brominated, versions of these copolymers; and (6) a blend of two or more of the aforementioned elastomers (1) to (5).

As a preference, one or more elastomers chosen from polybutadiene and poly(styrene/butadiene), which are advantageously suitable for the manufacture of tire treads, are used.

One or more reinforcing fillers, such as a white filler and/or carbon black, may be used in the composition according to the invention.

According to a preferred embodiment of the invention, a white reinforcing filler is used.

The expression "white reinforcing filler" is understood to mean a white filler capable of reinforcing, by itself, without any means other than that of a coupling agent, a composition based on one or more elastomers of the natural or synthetic rubber type.

It is a matter of indifference in what physical state the white reinforcing filler is, that is to say it may be in the form of powder, microspheres, granules or beads.

The white reinforcing filler generally consists of silica, aluminum or a mixture of these two species.

More preferably, the white reinforcing filler consists of silica, by itself or as a mixture with alumina.

As examples of silica that can be used in the composition according to the invention, all precipitated or pyrogenic silicas known to those skilled in the art having a BET specific surface area of not less than 450 m$^2$/g are suitable. It is preferred to use precipitated silicas, which may be conventional silicas or highly dispersible silicas. The expression "highly dispersible silica" is understood to mean any silica with a very high capability of deagglomerating and of dispersing in a polymeric matrix, as can be observed by electron microscopy or optical microscopy on thin sections.

As nonlimiting examples of highly dispersible silicas, mention may be made of those having a CTAB specific surface area of not less than 450 m$^2$/g, preferably ranging from 30 to 400 m$^2$/g, and particularly those described in U.S. Pat. No. 5,403,570 and patent applications WO-A-95/09127 and WO-A-95/09128.

As nonlimiting examples of such highly dispersible silicas, mention may be made of the silica Perkasil KS 430 from Akzo, the silica BV3380 from Degussa, the silicas Zeosil 1165 MP and 1115 MP from Rhodia, the silica Hi-Sil 2000 from PPG and the silicas Zeopol 8741 and 8745 from Huber.

More preferably, very suitable precipitated silicas are those having:

a CTAB specific surface area ranging from 100 to 240 m$^2$/g, preferably 100 to 180 m$^2$/g;

a BET specific surface area ranging from 100 to 250 m$^2$/g, preferably 100 to 190 m$^2$/g;

a DOP oil uptake of less than 300 ml/100 g, preferably ranging from 200 to 295 ml/100 g; and a BET specific surface area/CTAB specific surface area ratio ranging from 1.0 to 1.6.

The poly(alkylphenol) polysulfides of formula (I) have been known for a long time, and in particular are sold by Atofina under the brand name VULTAC®. They may be prepared by reacting a sulfur monochloride or dichloride with an alkylphenol at a temperature between 100 and 200° C. according to the following reaction:

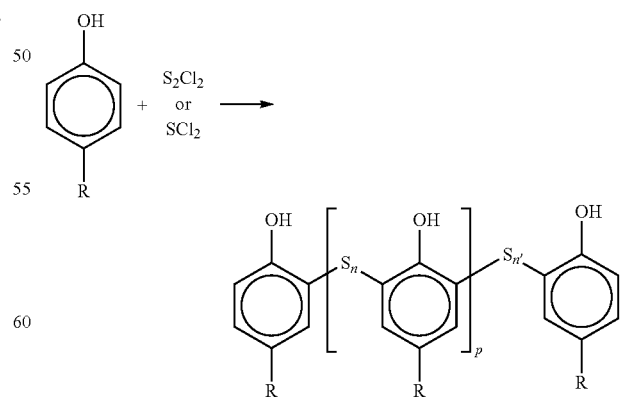

The reader may refer to the U.S. Pat. No. 2,422,156 and U.S. Pat. No. 3,968,062 for the manufacture of these products.

In a preferred embodiment, a mixture of compounds of formula (I) is used in which R is an alkyl radical containing at least one tertiary carbon via which R is linked to the aromatic ring.

In a particularly advantageous embodiment, R is a tert-butyl or tert-pentyl radical.

It is even more preferable to use, as mixture of compounds of formula (I), a mixture in which the average value of n and of n' is about 2 and the average value of p is about 5. These average values are calculated by those skilled in the art from proton NMR data and by gravimetric sulfur assay.

As coupling agent in the composition according to the invention, it is preferred to use a combination of the product of formula (I) and the product (II), in which the (I)/(II) weight ratio is from 1 to 3 and preferably about 2.

The subject of the present invention is also the coupling agent as defined above.

The product (II) called bis(triethoxysilylpropyl)tetrasulfide is a mixture of compounds of formula:

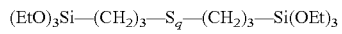

$(EtO)_3Si—(CH_2)_3—S_q—(CH_2)_3—Si(OEt)_3$ in which the average value of q is about 4. This product is commercially available, for example from Degussa AG (Germany) under the brand name Si-69®.

According to a preferred embodiment, the product (II) is used in the composition according to the invention in the form of a 50%/50% mixture by weight with carbon black.

When, according to a preferred embodiment of the invention, a white filler, especially silica, is used as reinforcing filler, the composition according to the invention is obtained by mixing, with 100 parts by weight of diene elastomer(s):

10 to 200, preferably between 20 and 150, parts by weight of white reinforcing filler; and 0.5 to 10, preferably 2 to 8, parts by weight of coupling agent as defined above.

In a preferred embodiment, 50 to 100 parts by weight of silica and 5 to 7 parts by weight of the coupling agent are mixed with 100 parts by weight of diene elastomer(s).

In a preferred embodiment, the method of preparing the sulfur-vulcanizable composition according to the invention further includes the incorporation of non-sulfur-containing additives normally used in elastomer compositions intended for the manufacture of treads, with the exception of the vulcanization system. These may in particular be plasticizers, pigments, antioxidants, vulcanization activators, and naphthenic or aromatic oil extenders. In this embodiment, the diene elastomer, the reinforcing filler, the products (I) and (II) and the non-sulfur-containing additives are subjected to mechanical working in any appropriate device, such as for example a mixer or an extruder, for the appropriate time, in such a way that it includes at least one thermal step at a temperature of between 130° C. and 170° C., preferably between 130° C. and 150° C.

The appropriate duration of the thermomechanical work varies according to the operating conditions adopted by those skilled in the art, and in particular to the chosen temperature within the range indicated above and to the nature and volume of the constituents subjected to the mechanical working. The essential point is that the mechanical working results in excellent dispersion of the filler, this being manifested, particularly if silica is used as filler, by a reduction in the size of the corresponding particles. It is also important for the required energy to be achieved by the time/temperature pair, and to do so using a variable number of steps to reach this energy level, so that the 300% elongation modulus/100% elongation modulus ratio is maximized. This ratio is one of the parameters commonly used by those skilled in the art for checking the efficiency of reinforcement of the elastomer by the filler.

Thus, depending on the thermomechanical devices used to carry out this thermomechanical work, the duration of said working may vary from 1 minute to 20 minutes and may be determined by a person skilled in the art from his general knowledge and from measuring the properties of the composition when used in the form of a tire tread. Thus, the thermomechanical work may comprise only a single thermomechanical step of appropriate duration, time and energy input, or it may comprise several thermomechanical steps possibly separated by at least one cooling step.

It is also advantageous to add, to the composition obtained according to the above embodiment, a vulcanization system comprising in particular the sulfur and the vulcanization accelerators, by finish mechanical working, for example using an external mixer at a temperature of less than 100° C. A standard system is used as vulcanization system, for example one comprising, apart from sulfur, vulcanization accelerators such as sulfenamide and/or diphenylguanidine.

The subject of the present invention is also a molded article that can be obtained by forming the composition obtained after incorporation of the vulcanization system and then heating.

After the composition has been formed in a suitable forming mold, for example by casting it, the composition is heated so as to vulcanize (or cure) it. As is known, this heating is carried out at a temperature generally ranging from 130° C. to 200° C., possibly with pressure applied, and for a sufficient time that may for example vary between 5 and 90 minutes, depending in particular on the cure temperature, the vulcanization system adopted and the vulcanization rate of the composition in question.

As molded article according to the invention, tire treads are preferred because of their advantageous properties, namely tensile strength, wet grip and rolling resistance.

EXAMPLES

The present invention is illustrated by the following non-limiting examples.

Example 1

Composition Based on Poly(Styrene/Butadiene) (or SBR) and Polybutadiene, Reinforced by Silica and Containing 4 Parts by Weight of Product (I) and 2 Parts by Weight of Product (II)

A—Preparation of the Composition:

Introduced into a 2-liter internal mixer of the Banbury type, in the following order, were: SBR, polybutadiene, three-quarters of the silica, the product (I) and the product (II) constituting the coupling agent, the rest of the silica and then the non-sulfur-containing additives.

These were all mixed until the temperature reached 145° C., i.e. for about 5 minutes. Mixing was continued at this temperature for 4 minutes.

The composition thus obtained was transferred to an external mixer of the two-roll mill type, each roll of which had a diameter of 300 mm and a length of 700 mm. The vulcanization system, comprising sulfur and the two vulcanization accelerators, was then added to the composition at a temperature below 100° C. The mixing was continued for about 5 minutes.

The contents of the various ingredients used to prepare the composition are indicated in Table I below. Each content is expressed in parts by weight per 100 parts by weight of elastomers.

B—Rheological Properties:

The Mooney viscosity was measured on the composition prepared as in A.

The Mooney viscosity is the result of measuring the consistometric index carried out according to French Standard NF T43-005 published by Afnor (French Standardization Association). This measurement carried out on an unvulcanized rubber uses an apparatus called a "shear consistometer".

The result is given in Table II below.

C—Vulcanization of the Composition:

One portion of the composition was formed as a slab and then vulcanized at a temperature of 170° C. for minutes. The slab was then cut into dumb bell test specimens (H2).

Another portion of the composition was formed as test specimens of the Goodrich type (cylinders measuring 25×18 mm) which were then vulcanized at a temperature of 170° C. for 25 minutes.

D—Properties of the Vulcanized Composition:

The following parameters were measured on the test specimens: M300/M100, tan δ at 0° C./10 Hz and tan δ at 60° C./10 Hz.

The 300% modulus/100% modulus ratio (or M300/M100), representative of the reinforcing index of the filler, was calculated from tensile tests carried out in accordance with French Standard NF T46-002 on dumb bell test specimens.

The value of tan δ measured at a temperature of 0° C. and at a frequency of 10 Hz characterizes the wet grip: the higher the value of tan δ at this temperature, the better the wet grip will be. The value of tan δ measured at a temperature of 60° C. and a frequency of 10 Hz characterizes the rolling resistance: the lower the value of tan δ at this temperature, the lower the rolling resistance and the better the fuel economy. These two parameters are measured in accordance with the ISO 4664: 1998 standard relating to viscoelastic properties under dynamic conditions on Goodrich-type specimens.

The results obtained are given in Table II below.

Example 2

Example 1 was repeated, with the contents of products (I) and (II) modified as indicated in Table I.

The properties given in Table II were obtained.

Control (Comparative) Example

Example 1 was repeated, but using as coupling agent only the product (II) with a content of 6.4 parts by weight (per 100 parts by weight of elastomers). This content corresponds to that of polysulfidic organosilane in patent EP 0 501 227 and to the amount of Si-69® usually introduced in the tire industry.

The measured properties are also given in Table II.

The examples according to the invention show a slightly higher consistometric index (Mooney viscosity) than that of the control example. However, it is still perfectly acceptable for producing sulfur-vulcanizable elastomeric compositions that are suitable for processing, especially as regards the operations of pouring them into a mold prior to the vulcanization forming operation.

Likewise, the reinforcement index of Examples 1 and 2 is substantially of the same order as that obtained for the control example.

In contrast, and surprisingly, the tan δ values indicate that the wet grip and the rolling resistance for the examples according to the invention are considerably improved over the control. These examples also allow a reduction in the cost of the coupling agent, since the product (I) is considerably less expensive than Si-69®.

TABLE I

|  | Example 1 | Example 2 | Control |
| --- | --- | --- | --- |
| SBR elastomer (1) | 103.12 | 103.12 | 103.12 |
|  | (i.e. 75 SBR) | (i.e. 75 SBR) | (i.e. 75 SBR) |
| Polybutadiene (2) | 25 | 25 | 25 |
| Silica (3) | 80 | 80 | 80 |
| Aromatic oil (4) | 4.38 | 4.38 | 4.38 |
| Zinc oxide (5) | 2.5 | 2.5 | 2.5 |
| Stearic acid (6) | 2.5 | 2.5 | 2.5 |
| Antioxidant (7) | 2 | 2 | 2 |
| UV stabilizer (8) | 1.5 | 1.5 | 1.5 |
| Sulfur (9) | 1.4 | 1.4 | 1.4 |
| Sulfenamide (10) | 1.7 | 1.7 | 1.7 |
| Diphenylguanidine (11) | 2 | 2 | 2 |
| Product (I) (12) | 4 | 3 | 0 |
| Product (II) (13) | 2 | 2 | 6.4 |

The characteristics of the ingredients used in Table I above were the following:

(1) styrene/butadiene copolymer prepared in solution, commercially available in the form of a 27.3% oil-extended elastomer, having a 25% styrene content, a 55% vinyl bond content, a 12% 1,4-trans bond content and an 8% 1,4-cis bond content. This product is sold under the brand name SBR Buna VSL 5525-1 by Bayer;

(2) polybutadiene having a 96.5% 1,4-cis bond content;

(3) highly dispersible silica having BET and CTAB surface areas of about 150 to 160 $m^2/g$, sold under the brand name Zeosil 1165 MP by Rhodia;

(4) aromatic oil sold under the brand name Huile Mobilsol K by Mobil;

(5) and (6) vulcanization activators;

(7) antioxidant sold under the brand name Antiox 6PPD;

(8) Antilux 500;

(9) elemental sulfur having a particle size below 300 μm;

(10) cyclohexylbenzothiazylsulfenamide, a vulcanization accelerator sold under the brand name EKALAND CBS by MLPC;

(11) vulcanization accelerator sold under the brand name EKALAND DPG by MLPC;

(12) poly(alkylphenol) polysulfide available under the name Vultac ® TB7 from Atofina, namely a mixture of compounds of formula (I) in which R is a tert-butyl radical, n and n' are each on average equal to about 2 and p is on average equal to about 5; and

(13) bis(triethoxysilylpropyl)tetrasulfide available under the brand name Si-69 ® from Degussa AG.

TABLE II

|  | Vulcanizable composition Consistometric index (Mooney viscosity) | Vulcanized article | | |
| --- | --- | --- | --- | --- |
|  |  | M300/M100 (reinforcement index) | tanδ at 0° C. (wet grip) | tanδ at 60° C. (rolling resistance) |
| Example 1 | 94 | 4.4 | 0.633 | 0.115 |
| Example 2 | 91 | 4.6 | 0.593 | 0.125 |
| Control | 71 | 4.9 | 0.519 | 0.129 |

The invention claimed is:

1. A method of decreasing the rolling resistance of a tire formed from a sulfur-vulcanized elastomeric composition comprising the steps of:

combining at least one diene elastomer selected from the group consisting of polybutadiene and poly(styrene/butadiene) and at least one reinforcing filler, with an effective amount of a coupling agent consisting of a combination of:

50 to 70%, of a product (I) consisting of a blend of poly(alkylphenol) polysulfides of formula:

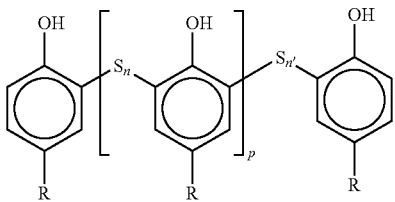

(I)

in which:
R is a tert-butyl or tert-pentyl radical;
n and n' are two integers, in which the average value of n and of n' is about 2 and the average value of p is about 5; and
30 to 50% of a product (II) consisting of bis(triethoxysilylpropyl)tetrasulfide, to form a mixture wherein the weight ration of (I)/(II) is from 1 to 3; thereafter
working said mixture; and thereafter
heating said mixture to vulcanize said mixture.

2. The method of claim 1, characterized in that a white reinforcing filler is used.

3. The method of claim 2, characterized in that said white filler is selected from the group consisting of silica, alumina and mixtures thereof.

4. The method of claim 1, characterized in that it comprises combining:
100 parts by weight of diene elastomer(s):
10 to 200 parts by weight of white reinforcing filler; and
0.5 to 10 parts by weight of coupling agent.

5. The method of claim 1, characterized in that 50 to 100 parts by weight of silica and 5 to 7 parts by weight of the coupling agent are combined with 100 parts by weight of said one or more diene elastomer.

6. The method of claim 1, characterized in that standard non-sulfur-containing additives are combined.

7. The method of claim 1 characterized in that the ratio (I)/(II) is about 2.

8. The method of claim 4 wherein between 20 and 150 parts by weight said white reinforcing filler are combined.

* * * * *